US011635323B2

(12) United States Patent
Weigert et al.

(10) Patent No.: US 11,635,323 B2
(45) Date of Patent: Apr. 25, 2023

(54) VEHICLE AND TRAILER LOAD DETERMINATION

(71) Applicant: GM GLOBAL TECHNOLOGY OPERATIONS LLC, Detroit, MI (US)

(72) Inventors: Norman J. Weigert, Whitby (CA); Michael Nguyen, Stoney Creek (CA); Ralph D. Schlottke, Whitby (CA); Sanjay K. Shakyaver, Scarborough (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 694 days.

(21) Appl. No.: 16/676,602

(22) Filed: Nov. 7, 2019

(65) Prior Publication Data
US 2021/0140812 A1   May 13, 2021

(51) Int. Cl.
| | |
|---|---|
| *G01G 19/02* | (2006.01) |
| *G01G 5/06* | (2006.01) |
| *G07C 5/08* | (2006.01) |

(52) U.S. Cl.
CPC ............. *G01G 19/022* (2013.01); *G01G 5/06* (2013.01); *G07C 5/085* (2013.01)

(58) Field of Classification Search
CPC ......... G01G 19/022; G01G 5/06; G07C 5/085
USPC .......................................................... 177/1
See application file for complete search history.

(56) References Cited

U.S. PATENT DOCUMENTS

| | | | | | |
|---|---|---|---|---|---|
| 2,156,325 | A | * | 5/1939 | Whitney | G01G 19/02 177/264 |
| 3,698,492 | A | * | 10/1972 | Lejeune | G01G 19/025 177/208 |
| 3,895,681 | A | * | 7/1975 | Griffin | G01G 19/025 177/208 |
| 3,910,364 | A | * | 10/1975 | Baker | G01G 23/16 414/362 |
| 4,020,911 | A | * | 5/1977 | English | G01G 19/12 177/136 |
| 4,489,798 | A | * | 12/1984 | Menon | G01G 5/04 177/209 |

(Continued)

FOREIGN PATENT DOCUMENTS

| | | |
|---|---|---|
| CN | 104330197 A | 2/2015 |
| CN | 104905804 A | 9/2015 |

(Continued)

OTHER PUBLICATIONS

Translation RU-2390734 (Year: 2010).*

(Continued)

*Primary Examiner* — Alexander A Mercado
*Assistant Examiner* — Monica S Young
(74) *Attorney, Agent, or Firm* — Cantor Colburn LLP

(57) ABSTRACT

A towing configuration of a vehicle coupled to a trailer may be evaluated by rolling a tire of the coupled vehicle and trailer over a compressible region of a pressure vessel filled with a hydraulic fluid. A peak pressure of the hydraulic fluid as the tire rolls over the compressible region of the pressure vessel may be determined. The tire load may be determined based upon the peak pressure. Based at least in part on the tire load, a determination may be made whether the towing configuration satisfies a predetermined set of criteria.

19 Claims, 3 Drawing Sheets

(56) References Cited

U.S. PATENT DOCUMENTS

| | | | | |
|---|---|---|---|---|
| 4,498,550 | A * | 2/1985 | Menon | G01G 5/04 |
| | | | | 177/209 |
| 4,605,081 | A * | 8/1986 | Helmly, Jr. | G01G 19/022 |
| | | | | 177/133 |
| 4,836,308 | A * | 6/1989 | Davis | G01G 23/01 |
| | | | | 73/1.13 |
| 5,002,141 | A | 3/1991 | Loshbough et al. | |
| 5,606,516 | A * | 2/1997 | Douglas | G01G 19/02 |
| | | | | 177/208 |
| 5,979,230 | A * | 11/1999 | Balsarotti | G01L 5/288 |
| | | | | 73/121 |
| 8,127,615 | B2 | 3/2012 | Dannhauer et al. | |
| 8,322,203 | B2 | 12/2012 | Pingel et al. | |
| 9,311,761 | B1 | 4/2016 | Ye et al. | |
| 9,851,241 | B2 | 12/2017 | Hofmann et al. | |
| 10,921,176 | B2 * | 2/2021 | Ribi | G01L 1/04 |
| 2013/0253814 | A1 | 9/2013 | Wirthlin | |
| 2018/0118221 | A1 | 5/2018 | Hall et al. | |

FOREIGN PATENT DOCUMENTS

| | | | | |
|---|---|---|---|---|
| CN | 109895065 A | | 6/2019 | |
| JP | 2013147242 A | * | 8/2013 | |
| KR | 100892956 B1 | * | 9/2006 | |
| KR | 20080001784 U | * | 1/2008 | |
| KR | 20080001784 U | * | 9/2008 | |
| RU | 2390734 C1 | * | 5/2010 | |
| WO | WO-2016186351 A1 | * | 11/2016 | G01G 19/02 |
| WO | WO-2017099757 A1 | * | 6/2017 | G01G 19/02 |

OTHER PUBLICATIONS

Translation KR-20080001784 (Year: 2008).*
Translation RU129224 (Year: 2013).*
Translation JP2013147242 (Year: 2013).*
CN Office Action for Chinese Application No. 20201122901.3; Report dated Feb. 14, 2022 (pp. 1-12).

* cited by examiner

VEHICLE AND TRAILER LOAD DETERMINATION

INTRODUCTION

Many vehicles are designed to accommodate the towing or trailering of various loads, including without limitation: cargo hoppers, campers, boats, and sometimes other vehicles. It is known that trailering changes the loading of the vehicle pulling the trailer. As such, vehicle dynamics are affected by a trailering load. It is known that trailering loads may vary significantly in gross weight and load distribution upon the trailer. Such variations affect trailer brake performance as well as loading of the vehicle pulling the trailer and hence vehicle and trailering configuration dynamics. Traction control systems are known which improve vehicle stability over a range of road and load conditions including vehicle loading by a trailer. Automatically-adjusting suspension systems are known which alter the height of the body of a vehicle in response to rear suspension displacement due to trailer tongue weight. However, the vehicle and trailering configuration, including fidelity to vehicle and trailer towing specifications, remains the responsibility of the vehicle operator.

SUMMARY

In one exemplary embodiment, a method for evaluating a towing configuration of a vehicle coupled to a trailer may include rolling a tire of the coupled vehicle and trailer over a compressible region of a pressure vessel filled with a hydraulic fluid. A peak pressure of the hydraulic fluid as the tire rolls over the compressible region of the pressure vessel may be determined in a processor. The tire load may be determined in the processor based upon the peak pressure. And, based at least in part on the tire load, a determination may be made in the processor whether the towing configuration satisfies a predetermined set of criteria.

In addition to one or more of the features described herein, the compressible pressure vessel may include a circular cross section.

In addition to one or more of the features described herein, determining the tire load may include using a predetermined relationship between hydraulic fluid pressure within the pressure vessel and force applied to the compressible region.

In addition to one or more of the features described herein, the tire may include a width and the compressible region of the pressure vessel may be at least as long as the width.

In addition to one or more of the features described herein, the predetermined relationship may include a lookup table including tire load as a function of peak pressure.

In addition to one or more of the features described herein, the predetermined relationship may include a lookup table including tire load as a function of peak pressure and a width of the tire.

In another exemplary embodiment, a method for evaluating a towing configuration of a vehicle and a trailer may include providing, to a processor, a respective non-towing contact force for each tire of the vehicle without the trailer coupled to the vehicle. A respective towing contact force for each tire of the vehicle and each tire of the trailer with the trailer coupled to the vehicle may be provided to the processor. And, based upon the respective non-towing and towing contact forces, a determination may be made by the processor whether the towing configuration satisfies a predetermined set of criteria.

In addition to one or more of the features described herein, the contact force for each tire may be determined by a process including, for each tire, driving the tire over a compressible region of a pressure vessel filled with a hydraulic fluid, determining a peak pressure of the hydraulic fluid as the tire rolls over the compressible region of the pressure vessel, and determining the contact force based upon the peak pressure.

In addition to one or more of the features described herein, the compressible region may include a circular cross section.

In addition to one or more of the features described herein, determining the contact force may include using a predetermined relationship between hydraulic fluid pressure within the pressure vessel and force applied to the compressible region.

In addition to one or more of the features described herein, the tire may include a width and the compressible region of the pressure vessel may be at least as long as the width.

In addition to one or more of the features described herein, the predetermined relationship may include a lookup table including contact force as a function of peak pressure.

In addition to one or more of the features described herein, the predetermined relationship may include a lookup table including contact force as a function of peak pressure and a width of the tire.

In yet another exemplary embodiment, an apparatus for evaluating a towing configuration having a vehicle coupled to a trailer may include at least one pressure measuring device having a pressure vessel filled with hydraulic fluid and a pressure sensor for measuring the hydraulic fluid pressure within the pressure vessel. The pressure vessel includes a compressible region. The apparatus may further include a control unit having a memory and a processor coupled to the memory. The processor may be operable to receive pressure sensor measurements from the at least one pressure measuring device while tires of the vehicle are driven across the compressible region without the trailer in tow. The processor further may be operable to receive pressure sensor measurements from the at least one pressure measuring device while tires of the vehicle are driven across the compressible region with the trailer in tow. The processor further may be operable to receive pressure sensor measurements from the at least one pressure measuring device while tires of the trailer are driven across the compressible region with the trailer in tow. The processor further may be operable to determine peak pressures from the received pressure sensor measurements corresponding to each tire of the vehicle without the trailer in tow and with the trailer in tow. The processor further may be operable to determine peak pressures from the received pressure sensor measurements corresponding to each tire of the trailer with the trailer in tow. And, the processor further may be operable to determine, based upon the respective peak pressures, whether the towing configuration satisfies a predetermined set of criteria.

In addition to one or more of the features described herein, the compressible region may include an elongated hose having a length sufficient to accommodate the width of each tire driven across the compressible region.

In addition to one or more of the features described herein, the at least one pressure measuring device may include a data acquisition module including an analog to digital converter.

In addition to one or more of the features described herein, the at least one pressure measuring device may include a wireless data transmission module for transmitting pressure sensor measurements.

In addition to one or more of the features described herein, the control unit may include at least a portion of a control architecture of the vehicle.

In addition to one or more of the features described herein, the control unit may include a handheld device.

In addition to one or more of the features described herein, determining, based upon the respective peak pressures, whether the towing configuration satisfies a predetermined set of criteria may include determining a tire load corresponding to each respective peak pressure using a predetermined relationship among tire load, hydraulic fluid pressure within the pressure vessel, and tire width.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
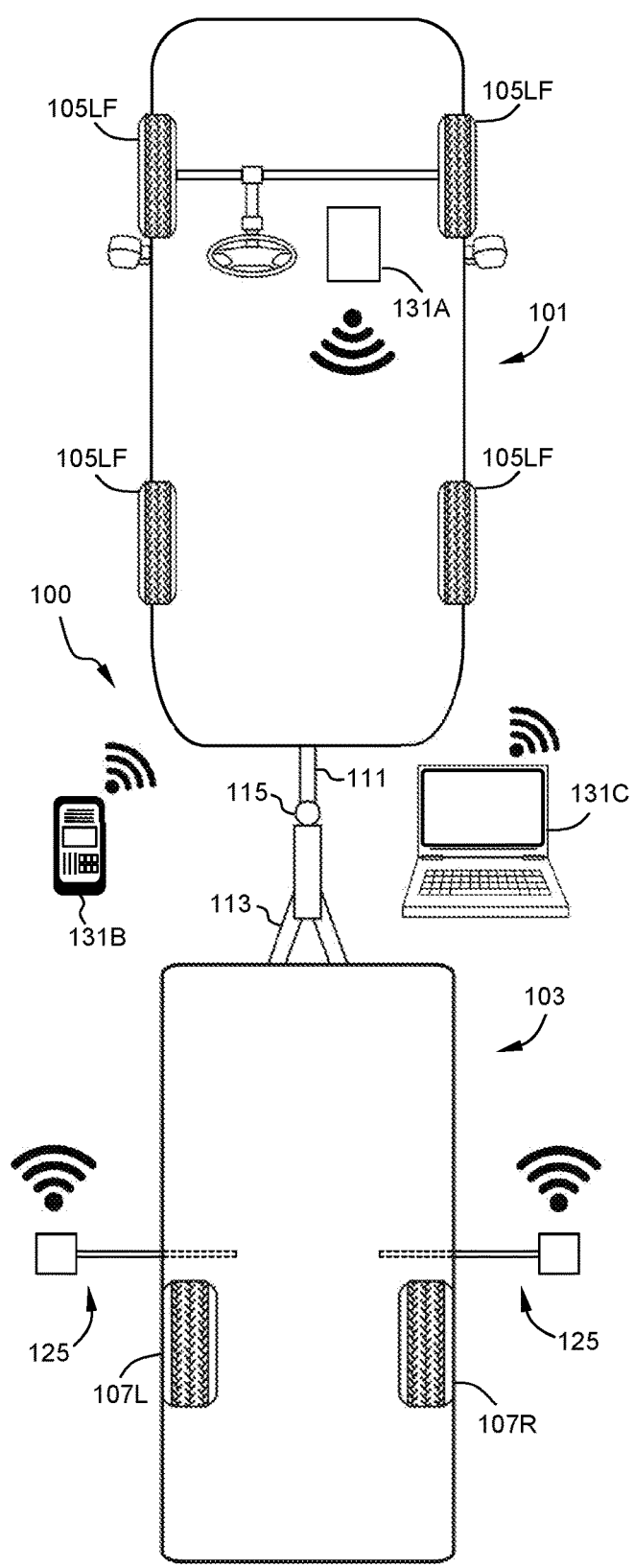
FIG. 1 illustrates an exemplary vehicle and trailer configuration in accordance with the present disclosure.

The following description is merely exemplary in nature and is not intended to limit the present disclosure, its application or uses. Throughout the drawings, corresponding reference numerals indicate like or corresponding parts and features. As used herein, control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

In accordance with the present disclosure, a method and system for evaluating vehicle and trailer towing configurations is set forth below and in the various drawings. FIG. 1 illustrates a towing configuration 100 including a vehicle 101 coupled to a trailer 103. The Vehicle 101 is configured with an exemplary receiver hitch and ball mount 111 including a ball and the trailer 103 is configured with a complementary ball socket coupler 115 at the end of a tongue 113. Alternative couplings are envisioned for towing configuration embodiments including, by way of example, pick-up bed mounted gooseneck and fifth wheel hitches. The vehicle 101 may be a four-wheel vehicle including a wheel and tire 105 at each corner with positions further designated by convention with appended letters as follows: LF (left front), LR (left rear), RF (right front) and RR (right rear). The trailer 103 is exemplified as a single-axle trailer including a wheel and tire 107 on each lateral side with positions further designated by convention with appended letters as L (left) and R (right). An exemplary trailer includes a bed 121 supported on a trailer frame which in turn is coupled by a sprung or unsprung suspension to the wheels 107L, 107R. Trailer 103 is exemplary and not limiting, it being understood that alternative trailer configurations may, for example, include multiple axles (tandem axle, tri-axle, etc.), be open or closed, be adapted for hauling and dumping loads, have tilting beds, or have center lift mechanisms and a narrow wheel base (e.g. for pontoon boats). As used herein, axle is understood to mean a pair of laterally opposing wheels and tires on a vehicle or trailer. Thus, the vehicle 101 has a front axle including the tires 105LF and 105RF, and a rear axle including the tires 105LR and 105RR. The trailer 103 includes one axle including the tires 107L and 107R. As used herein, tire may refer to a single tire or multiple tires at one side of an axle, for example on a dually pick-up axle or a single or multi-axle dually trailer. Tire width as used herein may be determined as the tire specification tire width. Tire width as used herein with respect to multiple tires at one side of an axle means an effective tire width of the multiple tires, which effective tire width is substantially the combined individual tire widths of the multiple tires.

Each tire of the vehicle 101 and trailer 103 has a corresponding tire load. Tire load may variously be referred to as, or may be understood to refer to, contact force, force or weight in various descriptions or contexts in the present disclosure. Tire loads are affected by the weight distribution (lateral and longitudinal) of the loads being carried within the vehicle and within the trailer. A vehicle coupled to a trailer will have tire loads that differ from tire loads of the same vehicle without the trailer coupled thereto. This is primarily due to the trailer tongue load which itself is related to the trailer load and its distribution. One having ordinary skill in the art recognizes that the vehicle has an associated gross vehicle weight (GVW) that includes its unloaded curb weight of the vehicle and the total weight of its passengers and cargo. The GVW is divided between the front and rear axles of the vehicle, each being referred to as the gross axle weight (GAW) of the respective front and rear axles. GAWs of the vehicle may further be affected by the tongue weight of a coupled trailer in a trailer configuration. GVW and GAWs of the vehicle may be further divided among each tire of the vehicle and referred to as individual tire loads or simply tire loads of the vehicle. Similarly, a trailer has an associated gross trailer weight (GTW) that includes its unloaded curb weight and the weight of its cargo. The GTW is divided between the axles of the trailer if multiple, each being referred to as a gross axle weight (GAW) of the respective trailer axle. In a single axle trailer, the GTW is equivalent to the GAW of the trailer axle. GTW and GAWs of the trailer may be further divided among each tire of the trailer and referred to as individual tire loads or simply tire loads of the trailer.

Figure 2:
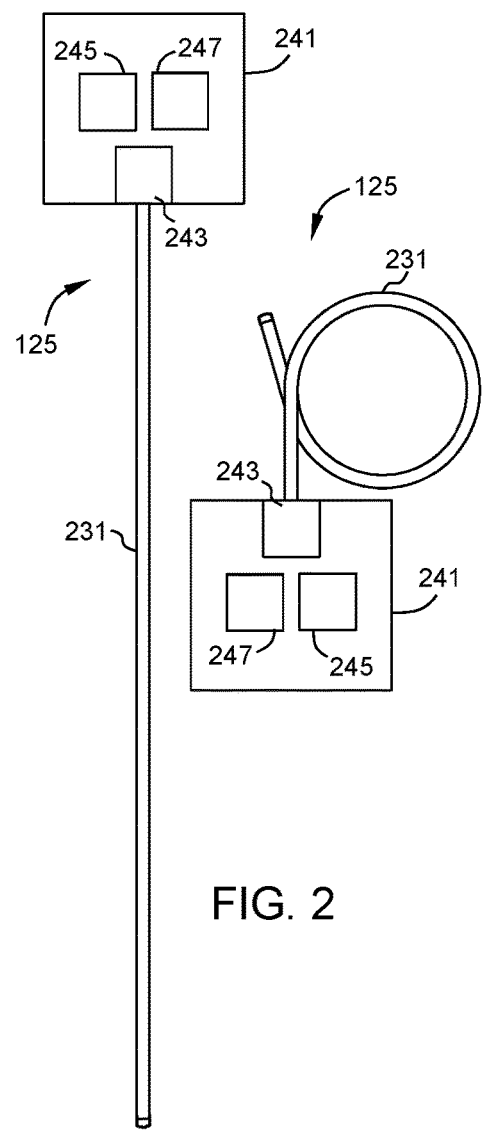
FIG. 2 illustrates a pair of sensing devices in accordance with the present disclosure.

In accordance with the present disclosure and with additional reference to FIG. 2, an exemplary embodiment of a method and system for evaluating vehicle and trailer towing configurations may include at least one pressure sensing device 125 used in determination of individual tire loads. An exemplary pressure sensing device includes a fluid filled pressure vessel having an elongated, flexible hose 231 as part of the pressure vessel. Hose 231 is compressible within at least a partial region thereof over which a vehicle and trailer is intended to be driven. The compressible region is preferably at least as long as the width of the tires running thereacross. The hose may be constructed uniformly and be compressible over substantially its entire length. Preferably, the hose 231 is circular in cross section; however, alternative embodiments may include other geometries, for example rectangular cross sections. A pressure sensor 243 is exposed to the working fluid within the pressure vessel and provides a raw signal that is correlated to the pressure of the fluid. Pressure sensor 243 may be a pressure transducer of any suitable type, including but not limited to strain gauge, variable capacitive, fiber optic, MEMS, vibratory element, or Piezoresistive. An electronics housing 241 encloses a data acquisition module 245 which reads the signal from the pressure sensor 243 as the vehicle and trailer wheels 105, 107 are driven over the compressible region of hose 231 and provides the data to a control unit for further processing which may include, for example, determination of the weight at each vehicle and trailer tire and derivation of GAWs of the vehicle, GAWs of the trailer, GVW, GTW, trailer tongue weight and gross combined weight (GCW) of the vehicle and trailer configuration. A control unit 131 for exchanging information with one or more pressure sensing devices 125 may, for example, be one or more automotive electronic control units (ECU) 131A on-board the vehicle 101. Alternatively, or additionally, control unit 131 may include a hand-held device such as, for example, a mobile device 131B such as a smart phone or tablet. Alternatively, or additionally, control unit 131 may be a laptop computer 131C or similar device. Alternatively, or additionally, control unit 131 may be embedded within on or more pressure sensing devices 125. Preferably, pressure sensing device 125 further includes a transceiver module 247 for short range wireless communication with a control unit 131 such as ECU 131A, mobile device 131B, laptop computer 131C or alternative, or between pressure sensing devices, for example where one pressure sensing devices 125 in a paired configuration includes an embedded control unit 131 wherein post-collection data processing routines may be executed.

The task of gathering individual tire loads in accordance with the present disclosure may include an interactive process with the vehicle operator. This may be accomplished with the aid of one or more exemplary pressure sensing devices 125. Preferably a pair of such pressure sensing devices 125 is employed in order to reduce cycle time associated with completing a towing configuration evaluation in accordance with the present disclosure.

A first set of data for determining vehicle tire loads for the vehicle, including the intended vehicle cargo loading, is obtained by extending each hose 231 of the pressure sensing devices 125 in front of the vehicle 101, aligned substantially perpendicular to the direction of vehicle travel and with each respective hose being in the path of the tires of one side of the vehicle. With such an arrangement, the vehicle 101 without the trailer in tow is merely driven at low speed such that each tire rolls over the respective hose—first the front tires 105LF, 105RF and then the rear tires 105LR, 105RR. Exact speeds at which the tires roll across the hose is not critical in the exemplary embodiment. Typical parking lot maneuver speed from a creep to about 5 mph have returned acceptably repeatable and accurate results. The pressure sensor 243 within each pressure sensing device 125 provides an analog signal corresponding to fluid pressure within the pressure vessel to the data acquisition module 245 which filters and converts the analog signal to digital data. The data may be communicated to the control unit 131, for example, ECU 131A, mobile device 131B, laptop computer 131C or alternative. Transmission of the data may be accomplished substantially in real time or may alternatively be accomplished subsequent to data buffering and temporary storage within the pressure sensing device. One can appreciate that with a dual pressure sensing device 125 arrangement that a single pass of the loaded vehicle 101 may provide digital data corresponding to all four tires of the vehicle. Alternatively, a single pressure sensing device 125 may be employed in the same fashion to provide digital data corresponding to all four tires of the vehicle 101 but in a process that requires configuring for two passes of the vehicle—one for the left side tires 105LF, 105LR and one for the right side tires 105RF, 105RR of the vehicle 101.

A second set of data for determining vehicle tire loads for the vehicle including the intended vehicle cargo loading and with the trailer in tow in the intended towing configuration is next obtained in similar fashion by driving the vehicle 101 and trailer 103 across the pressure sensing devices 125. In addition to the second set of vehicle tire loads corresponding to the trailering configuration under analysis, a set of data corresponding to the trailer tires is also obtained. The data corresponding to the towing configuration may be communicated to the control unit 131 in the same manner as discussed above with respect to the non-towing configuration corresponding to the vehicle alone.

Figure 3:
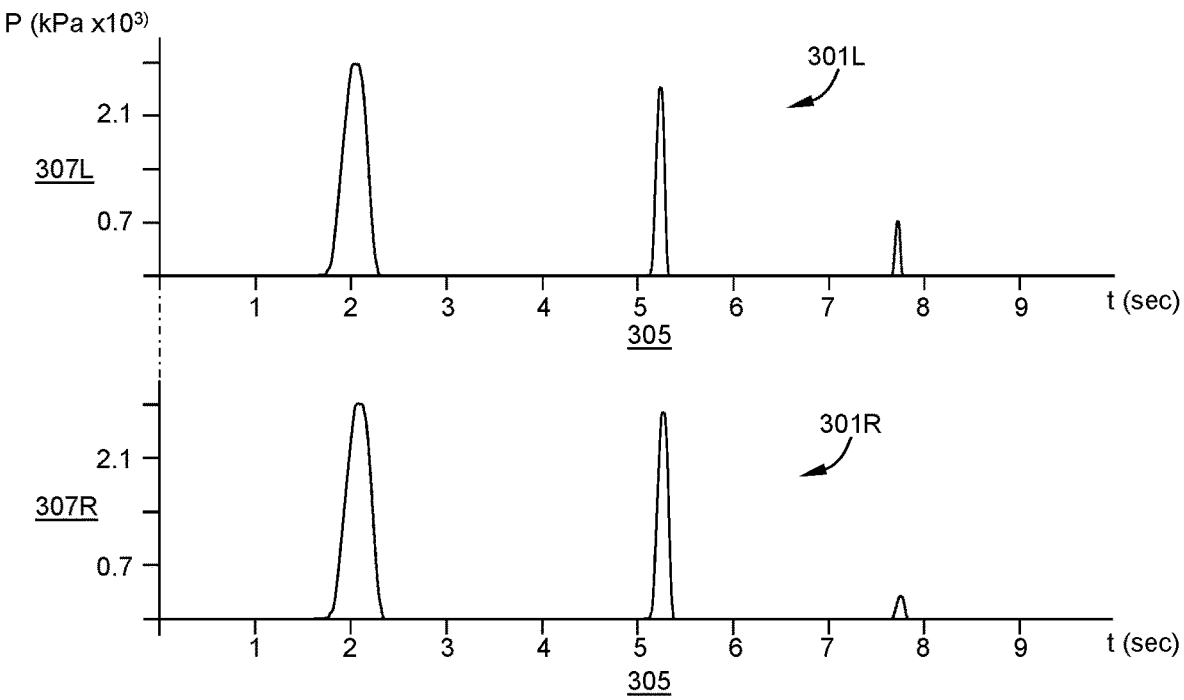
FIG. 3 illustrates exemplary pressure traces from the exemplary sensing device of FIG. 2 in accordance with the present disclosure.

With additional reference to FIG. 3, a graphical representation 300 of tire induced hydraulic pressure within the exemplary pressure vessel of pressure sensing devices 125 corresponding to a towing configuration in accordance with the present disclosure is illustrated. Both graphs illustrate hydraulic pressure (P) in Kilopascals (kPa) along the vertical axes and time (t) in seconds (sec) across the horizontal axes. The top graph 301L corresponds to left side tires whereas lower graph 301R corresponds to right side tires. From left to right on each graph appears induced pressures by the respective front tire, the respective rear tire and the respective trailer tire. Each pressure trace has an identifiable peak or maximum which, in accordance with the present disclosure, is of particular interest.

Figure 4:
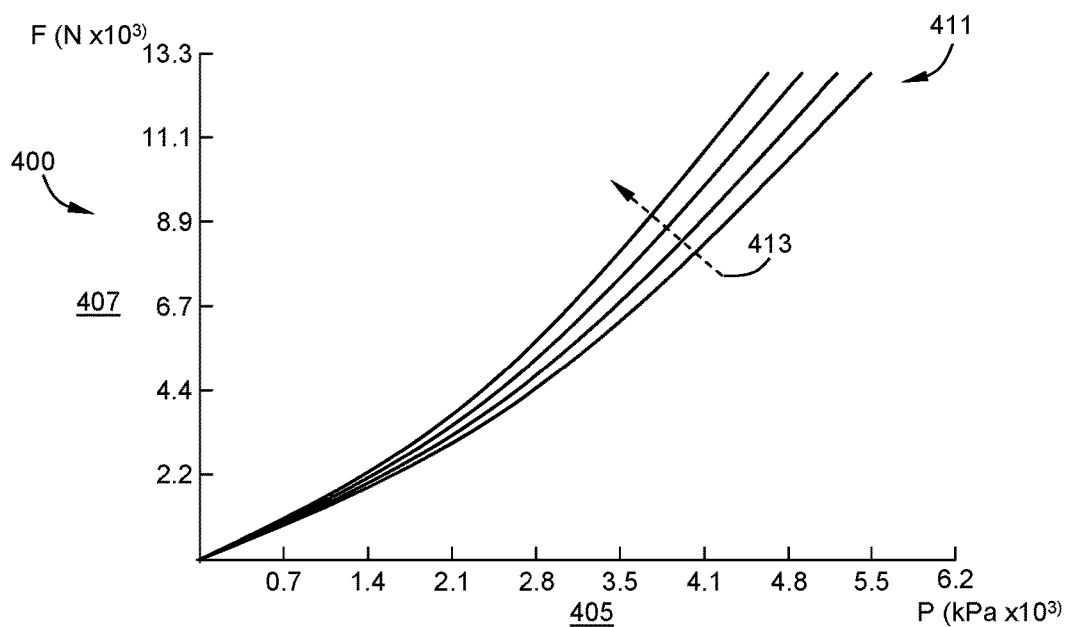
FIG. 4 illustrates exemplary pressure/force relationship in accordance with the present disclosure.

Peak pressure of the hydraulic fluid within the pressure vessel of the pressure sensing device 125 may be correlated to tire load or weight. When tire width is known, the peak pressure within the pressure vessel induced by a given tire load upon the compressible region thereof may be substantially repeatable, and varying tire loads may produce unique but repeatable peak pressures. Conventional curve fitting techniques may be applied to peak pressure across varying tire loads to develop mathematical equations which in turn may represent a relationship between hydraulic fluid pressure within the pressure vessel and tire load applied to the compressible region of the pressure vessel. Additionally, other factors which may impact the pressure measured within the pressure vessel may be accounted for in more complex mathematical equations or families of mathematical equations. For example, vehicle speed and tire pressure may affect the pressure measured within the pressure vessel. Both vehicle speed and tire pressure are readily obtainable, for example through a controller area network (CAN) for use in conjunction with such mathematical equations in determining tire load. Alternatively, through known system calibration and characterization techniques, data sets or look-up tables may be developed which reflect the relationships among pressure within the pressure vessel, tire width and tire load. These empirically determined relationships among pressure within the pressure vessel, tire width and tire load may be used in the determination of individual tire loads in accordance with the present disclosure. Again, other factors such as vehicle speed and tire pressure which may impact the pressure measured within the pressure vessel may be accounted for in additional dimensions in the look-up table structure and provided through a controller area network (CAN) for use in look-up table data retrieval. With additional reference to FIG. 4, a graphical representation 400 of relationships between tire induced hydraulic pressure within the exemplary pressure vessel of pressure sensing devices 125 and tire load is illustrated. The graph illustrates hydraulic pressure (P) in Kilopascals (kPa) along the horizontal axis and tire load (F) in Newtons (N) across the vertical axis. The plurality of curves 411 represent various increasing tire widths in the direction of the arrow 413. Thus, it can be appreciated that wider tires result in lower peak pressures for any given tire load.

Figure 5:
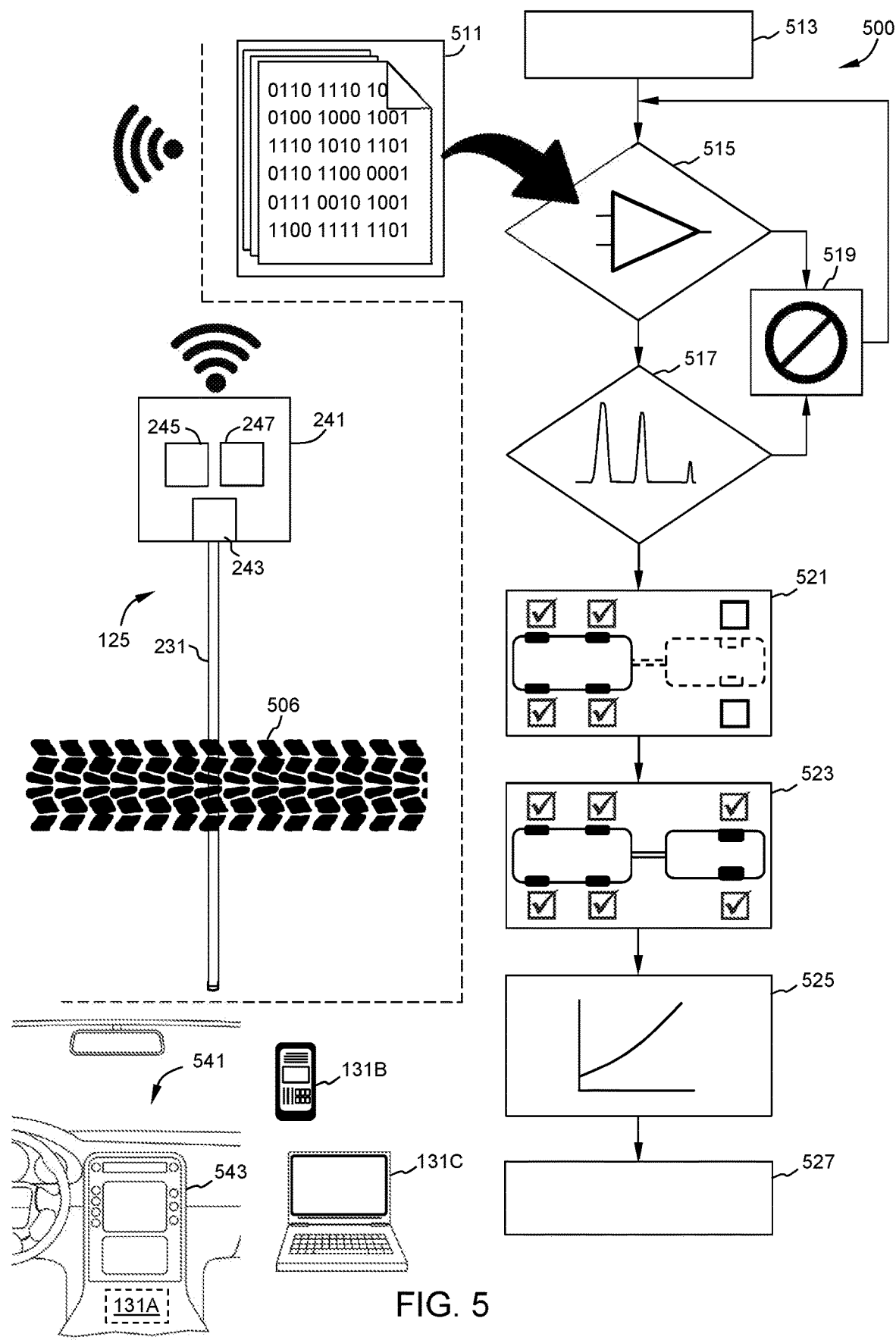
FIG. 5 illustrates an exemplary system and method in accordance with the present disclosure.

In accordance with the present disclosure and with additional reference to FIG. 5, an exemplary embodiment of a method and system for evaluating vehicle and trailer towing configurations may include at least one pressure sensing device 125 used in determination of individual tire loads. The pressure sensing device 125 includes the pressure vessel hose 231, pressure sensor 243, electronics housing 241 enclosing data acquisition module 245 and transceiver module 247. In operation, the hose is extended into the path 506 of the vehicle and trailer tires and substantially perpendicular thereto. A control unit 131, such as ECU 131A, mobile device 131B, laptop computer 131C or alternative, is configured to receive data stream 511 from pressure sensing device 125, preferably through wireless communication but not limited thereto. Such data stream may be received through any appropriate means including an intermediate enterprise network, direct cable or bus, or on-vehicle bus system such as, for example, the CAN bus, or by way of a portable, intermediate memory device such as a so-called thumb drive. The data stream includes data serially collected representing the tire induced pressures within the pressure sensing device 125 pressure vessels as the tires roll across the compressible region thereof as described herein. One set of data may include data corresponding to the left side tires of the vehicle 101 from front to back without a trailer in tow followed by the right side tires of the vehicle 101 from front to back without a trailer in tow. Another set of data may include data corresponding to the left side tires of the vehicle 101 and trailer 103 from front to back with the trailer in tow followed by the right side tires of the vehicle 101 and trailer 103 from front to back with the trailer in tow.

A routine 500 includes processing the data stream and may be embodied in a computer program executed within one or more control units 131 as previously disclosed. The routine may include tasks (513) including initial data gathering automatically or through user input or confirmation. For example, various data related to the vehicle and trailer may be required for the best results of a trailer configuration analysis in accordance with the present disclosure. Data such as GVW rating, GAW ratings for the vehicle, and GCW rating may be stored in memory in on-board vehicle systems and accessible to the control unit 131. Other data, such as GAW ratings for the trailer, GTW rating, and the various tire widths on the vehicle and trailer may be stored in memory in the control unit 131 but be subject to verification due to their potentially temporal nature. Alternatively, such temporal data may be required to be separately input each time a towing configuration is evaluated. User input and initialization of the towing configuration evaluation may be effected by way of a graphical and instructional user interface such as a touch screen 543 associated with a center stack located within the cabin 541 of the vehicle 101, or a touchscreen associated with mobile device 141 or laptop computer 151 in accordance with alternate embodiments.

The routine may include evaluation (515) of the data stream 511, for example by filtering quiescent data corresponding to periods during the task of gathering individual tire loads when the tire is not in contact with the hose 231. Such quiescent data is ignored (519) and the next data in the stream is evaluated (515). All data that is not quiescent is evaluated further in a peak detection module (517) which may compare currently stored data corresponding to a tire to next sequential data corresponding to the tire and storing the larger of the two. Otherwise, the smaller of the two is ignored (519) and the next data in the stream is evaluated (515). For so long as the data is not quiescent, and thus indicating tire induced pressure, the comparisons of peak detection module (517) continue. When the streaming data once again goes quiescent, then the tire induced pressure data for the presently evaluated tire has all been evaluated in the peak detection module (517) and the stored peak value data corresponding to the highest tire induced pressure for that tire is saved as the peak pressure for that tire. The routine continues for all data streams which may result in saving the peak pressures for all tires of the vehicle 101 without a trailer in tow (521) and all tires of the vehicle 101 and trailer 103 with the trailer in tow (523).

Peak pressures for each vehicle tire with and without the trailer in tow and the peak pressures for each trailer tire may next be used in the routine to determine individual tire loads (525). Individual tire loads may be determined, for example, by one or more mathematical expressions, equations or formula embodying the empirically determined relationships among peak pressure, tire load and tire width as set forth in the present disclosure. Alternatively, the empirically determined relationships among peak pressure, tire load and tire width may be embodied in various look-up tables used to determine the individual tire loads.

The routine may include a variety of derivations of additional data from the individual tire loads determined herein. The routine may additionally include a variety of tests and comparisons in an evaluation of the present towing configuration of the vehicle 101 and trailer 103. Thus, evaluation module (527) may combine certain individual tire loads to determine various GAWs for the vehicle 101 and trailer 103, GVW (with and without trailer), GTW, GCW, fore/aft and lateral load distributions in the vehicle and trailer, and tongue weight. Therefore, based upon the individual tire loads as determined in accordance with the present disclosure, comparisons against a variety of vehicle and trailer rating specifications may be made and information regarding the towing configuration conveyed to the vehicle operator by way of the user interface associated with the control unit 131. Such comparisons or evaluations may include, for example, comparisons of determined tongue weight to a recommended minimum percentage of GTW and notification to the operator whether the present tow configuration meets the recommended minimum. Other evaluations may be made, for example, comparison of GCW with GCW rating and notification to the operator whether the present tow configuration violates the rating. One having ordinary skill in the art will understand that a plurality of such evaluations may be made at varying levels of detail and criticality toward achieving successful trailering results, and a variety of notifications, information and warnings may be conveyed to the operator in furtherance of this objective.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for evaluating a towing configuration of a vehicle coupled to a trailer at a trailer tongue, comprising:
    rolling a tire of the coupled vehicle and trailer over a compressible region of a pressure vessel filled with a hydraulic fluid, the compressible region of the pressure vessel comprising an elongated hose extended substantially perpendicular to a path of the tire, wherein rolling the tire of the coupled vehicle and trailer over the compressible region of the pressure vessel comprises rolling the tire across and in contact with the elongated hose extended substantially perpendicular to the path of the tire;
    determining, in a processor, a peak pressure of the hydraulic fluid as the tire rolls across and in contact with the elongated hose extended substantially perpendicular to the path of the tire;
    determining, in the processor, a tire load based upon the peak pressure; and
    determining, in the processor and based at least in part on the tire load, whether the coupled vehicle and trailer comprises a towing configuration satisfying a predetermined set of criteria, comprising a recommended minimum tongue weight.

2. The method of claim 1, wherein said compressible region of the pressure vessel comprises a circular cross section.

3. The method of claim 1, wherein determining the tire load comprises using a predetermined relationship between hydraulic fluid pressure within the pressure vessel and tire load applied to the compressible region.

4. The method of claim 3, wherein the predetermined relationship comprises a look-up table including tire load as a function of peak pressure.

5. The method of claim 3, wherein the predetermined relationship comprises a look-up table including tire load as a function of peak pressure and a width of the tire.

6. The method of claim 1, wherein the tire comprises a width and the compressible region of the pressure vessel is at least as long as the width.

7. A method for evaluating a towing configuration of a vehicle and a trailer coupled at a trailer tongue, comprising:
    providing, to a processor, a respective non-towing tire load for each tire of the vehicle without the trailer coupled to the vehicle;
    providing, to the processor, a respective towing tire load for each tire of the vehicle and each tire of the trailer with the trailer coupled to the vehicle;
    wherein the tire load for each tire may be determined by a process comprising, for each tire:
        driving the tire over a compressible region of a pressure vessel filled with a hydraulic fluid, the compressible region of the pressure vessel comprising an elongated hose extended substantially perpendicular to a path of the tire, wherein driving the tire over the compressible region of the pressure vessel comprises driving the tire across and in contact with the elongated hose extended substantially perpendicular to the path of the tire;
        determining a peak pressure of the hydraulic fluid as the tire rolls across and in contact with the elongated hose extended substantially perpendicular to the path of the tire; and
        determining the tire load based upon the peak pressure; and
    determining, by the processor and based upon the respective non-towing and towing tire loads, whether the coupled vehicle and trailer comprises a towing configuration satisfying a predetermined set of criteria, comprising a recommended minimum tongue weight.

8. The method of claim 7, wherein said compressible region comprises a circular cross section.

9. The method of claim 7, wherein determining the tire load comprises using a predetermined relationship between hydraulic fluid pressure within the pressure vessel and tire load applied to the compressible region.

10. The method of claim 9, wherein the predetermined relationship comprises a look-up table comprising tire load as a function of peak pressure.

11. The method of claim 9, wherein the predetermined relationship comprises a look-up table comprising tire load as a function of peak pressure and a width of the tire.

12. The method of claim 7, wherein the tire comprises a width and the compressible region of the pressure vessel is at least as long as the width.

13. An apparatus for evaluating a towing configuration comprising a vehicle coupled to a trailer at a trailer tongue, comprising:
  at least one pressure measuring device comprising a pressure vessel filled with hydraulic fluid and comprising a compressible region having an elongated hose, and a pressure sensor for measuring the hydraulic fluid pressure within said pressure vessel; and
  a control unit comprising a memory and a processor coupled to the memory, the processor operable to:
  receive pressure sensor measurements from said at least one pressure measuring device while tires of the vehicle are driven across and in contact with the elongated hose extended substantially perpendicular to a path of the tires without the trailer in tow;
  receive pressure sensor measurements from said at least one pressure measuring device while tires of the vehicle are driven across and in contact with the elongated hose extended substantially perpendicular to the path of the tires with the trailer in tow;
  receive pressure sensor measurements from said at least one pressure measuring device while tires of the trailer are driven across and in contact with the elongated hose extended substantially perpendicular to the path of the tires with the trailer in tow;
  determine peak pressures from the received pressure sensor measurements corresponding to each tire of the vehicle without the trailer in tow and with the trailer in tow;
  determine peak pressures from the received pressure sensor measurements corresponding to each tire of the trailer with the trailer in tow;
  provide a tire width corresponding to each tire of the vehicle and the trailer; and
  determine, based upon the respective peak pressures and corresponding tire width, whether the towing configuration satisfies a predetermined set of criteria, comprising a recommended minimum tongue weight.

14. The apparatus of claim 13, wherein said elongated hose has a length sufficient to accommodate the corresponding tire width of each tire driven across the elongated hose.

15. The apparatus of claim 13, wherein said at least one pressure measuring device comprises a data acquisition module including an analog to digital converter.

16. The apparatus of claim 13, wherein said at least one pressure measuring device comprises a wireless data transmission module for transmitting pressure sensor measurements.

17. The apparatus of claim 13, wherein said control unit comprises at least a portion of a control architecture of the vehicle.

18. The apparatus of claim 13, wherein said control unit comprises a handheld device.

19. The apparatus of claim 13, wherein determine, based upon the respective peak pressures, whether the towing configuration satisfies a predetermined set of criteria comprises determine a tire load corresponding to each respective peak pressure using a predetermined relationship among tire load, hydraulic fluid pressure within the pressure vessel, and tire width.

* * * * *